United States Patent
Yamashita et al.

(10) Patent No.: US 9,930,381 B1
(45) Date of Patent: Mar. 27, 2018

(54) ANCILLARY DATA VIDEO VALIDATOR AND QC SYSTEM

(71) Applicant: Disney Enterprises, Inc., Burbank, CA (US)

(72) Inventors: Jason Yamashita, Burbank, CA (US); Lawrence Anthony, Malibu, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/280,267

(22) Filed: Sep. 29, 2016

(51) Int. Cl.
- H04N 7/173 (2011.01)
- H04N 21/235 (2011.01)
- H04N 21/485 (2011.01)
- H04N 21/4147 (2011.01)

(52) U.S. Cl.
CPC ....... *H04N 21/235* (2013.01); *H04N 21/4147* (2013.01); *H04N 21/485* (2013.01)

(58) Field of Classification Search
CPC ........... H04N 21/23418; H04N 21/235; H04N 21/2351; H04N 21/2353; H04N 21/2355; H04N 21/236; H04N 21/23614; H04N 21/2362; H04N 21/43; H04N 21/434; H04N 21/4345; H04N 21/435; H04N 21/4351; H04N 21/4353; H04N 21/4355; H04N 21/44222; H04N 21/80; H04N 21/812; H04N 21/8126; H04N 21/8133; H04N 21/8352; H04N 21/8355; H04N 21/8358; H04N 21/4147; H04N 21/485
USPC ....................................................... 725/107
See application file for complete search history.

(56) References Cited

U.S. PATENT DOCUMENTS

| | | | | |
|---|---|---|---|---|
| 4,639,779 A | * | 1/1987 | Greenberg | H04H 20/14 348/192 |
| 5,790,204 A | * | 8/1998 | Yamaguchi | H04N 5/45 348/564 |
| 5,872,588 A | * | 2/1999 | Aras | H04N 7/17354 348/E7.075 |
| 7,380,265 B2 | * | 5/2008 | Jensen | H04L 41/0681 725/107 |
| 7,483,975 B2 | * | 1/2009 | Kolessar | G06Q 30/02 709/205 |
| 8,578,404 B2 | * | 11/2013 | McMillan | H04H 60/43 725/19 |

(Continued)

FOREIGN PATENT DOCUMENTS

WO    2015071490 A1    5/2015

*Primary Examiner* — John Schnurr
(74) *Attorney, Agent, or Firm* — Patterson + Sheridan, LLP

(57) ABSTRACT

Network signals in a broadcast network can include ancillary data as well as audio and visual of a media presentation. Typically, the ancillary data is not displayed by the television when outputting the audio and visual data although it may be in some cases. To ensure the network signal is compatible with the components in the broadcast network, the embodiments herein test the network signal use an emulated version of the broadcast network. For example, the content provider can set up a local version of broadcast network using the hardware components of the broadcast network (e.g., a cable head end, network modulators, set top boxes, receivers, etc.). By transmitting the network signal through the emulated broadcast network, the content provider can verify that the ancillary data will be correctly transmitted through the actual broadcast network.

20 Claims, 5 Drawing Sheets

(56) References Cited

U.S. PATENT DOCUMENTS

| | | | |
|---|---|---|---|
| 8,813,146 B2* | 8/2014 | Pham | H04N 17/004 |
| | | | 348/180 |
| 8,897,144 B2* | 11/2014 | Hui | H04L 65/605 |
| | | | 370/241 |
| 8,978,081 B2* | 3/2015 | McClay | H04N 17/004 |
| | | | 348/181 |
| 9,596,521 B2* | 3/2017 | Winograd | H04N 21/44204 |
| 2002/0026635 A1* | 2/2002 | Wheeler | H04H 60/39 |
| | | | 725/19 |
| 2010/0180315 A1* | 7/2010 | Nakamichi | H04N 17/004 |
| | | | 725/116 |

* cited by examiner

ANCILLARY STATUS DISPLAY

FlexScanS1703

720p/59.94   YCbCr(422)   1/A EXT   2015/10/23   TC--:--:--:--

ANC PACKET SUMMARY
   AUDIO CONTROL PACKET   DETECT
   EDH   MISSING
   LTC   MISSING
   VITC   MISSING
   FORMAT ID   DETECT
   V-ANC SMPTE EIA-708
          708 CC   DETECT
          608 CC   DETECT
      EIA-608   MISSING
      PROGRAM   MISSING
      DATA BROADCAST   MISSING
      VBI   MISSING
      AFD   MISSING
V-ANC   ARIB   CLOSED CAPTION 1   MISSING
      CLOSED CAPTION 2   MISSING
      CLOSED CAPTION 3   MISSING
      NET-Q   MISSING
      TRIGGER PACKET   MISSING
      USER DATA 1   MISSING
      USER DATA 2   MISSING

| | FORMAT ID | CONTROL PACKET | V-ANC ARIB | V-ANC SMPTE | CUSTOM SEARCH | UP MENU |
|---|---|---|---|---|---|---|

WAVEFORM MONITOR OUTPUT 200

FIG. 2

ANCILLARY DATA VIDEO VALIDATOR AND QC SYSTEM

BACKGROUND

Field of the Invention

The embodiments herein are generally directed to verifying ancillary data in a broadcast signal.

Description of the Related Art

Network signals are signals provided by a service provider—e.g., a cable network provider, satellite provider, or over-the-air provider—which are encoded to include audio and visual data of a media presentation such as a movie, television show, sporting event, news programs, and the like. The end user may include a set top box or a receiver that receives and converts the network signals into audio and visual data which is then outputted on, for example, a television.

The network signals can include ancillary data as well as the audio and visual of the media presentation. Typically, the ancillary data is not displayed by the television when outputting the audio and visual data although it may be in some cases. For example, the ancillary data may include closed captioning data which can be selectively displayed depending on the preference of the customer. Other examples of ancillary data include triggers for a digital video recorder (DVR), identification data of the media presentation, and time codes. These types of ancillary data are typically used by the receiver, DVR, or set-top-box rather than being viewed by the customer.

SUMMARY

One embodiment described herein is a method that includes converting a baseband signal to a network signal used in an emulated broadcast network, the baseband signal comprising audio/visual (AV) data and ancillary data corresponding to a media presentation. The method includes generating a video stream from the network signal after the network signal has propagated through the emulated broadcast network where the video stream includes a plurality of display frames of the media presentation and where each of the plurality of display frames displays a program ID in the ancillary data. The method includes performing textual recognition to identify the program ID in a first one of the plurality of display frames and verifying the ancillary data was transmitted correctly through the emulated broadcast network by comparing the identified program ID to an expected program ID corresponding to the media presentation.

Another embodiment described herein is a system that includes an emulated broadcast network comprising at least one hardware component, where the emulated broadcast network is configured to convert a baseband signal to a network signal used in the emulated broadcast network the baseband signal comprising audio/visual (AV) data and ancillary data corresponding to a media presentation. The system includes video encoder configured to generate a video stream from the network signal after the network signal has propagated through the emulated broadcast network, the video stream includes a plurality of display frames of the media presentation, and each of the plurality of display frames displays a program ID in the ancillary data. The system includes an optical character recognition (OCR) extractor configured to perform textual recognition to identify the program ID in a first one of the plurality of display frames and an ancillary data comparator configure to verify the ancillary data was transmitted correctly through the emulated broadcast network by comparing the identified program ID to an expected program ID corresponding to the media presentation.

Another embodiment described herein is a system that includes one or more computing processors and a memory comprising a program that when executed by the one or more computer processors performs an operation for verifying ancillary data was transmitted correctly through an emulated broadcast network. The operation includes receiving a video stream derived from a network signal that has propagated through the emulated broadcast network where the video stream includes a plurality of display frames of a media presentation encoded in the network signal and where each of the plurality of display frames also displays ancillary data encoded the network signal. The operation includes performing textual recognition to identify text in the ancillary data displayed in a first one of the plurality of display frames and verifying the ancillary data was transmitted correctly through the emulated broadcast network by comparing the identified text of the ancillary data to expected text corresponding to the media presentation.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 illustrates displaying ancillary data encoded in a network signal, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
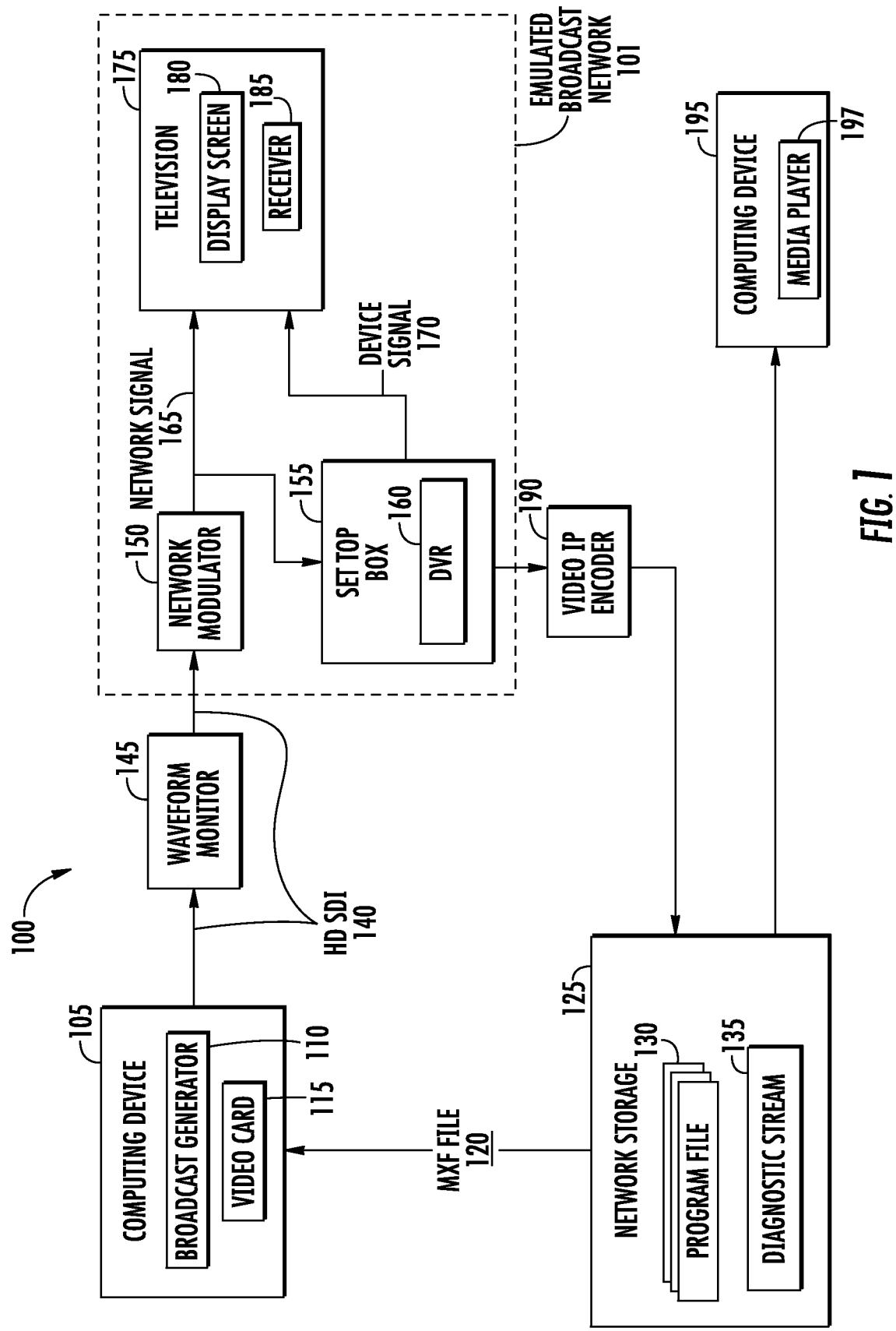
FIG. 1 illustrates a system for transmitting ancillary data in an emulated broadcast network, according to one embodiment described herein.

A content provider may store content as program files which include audio and visual data for respective media presentations as well as ancillary data for the media presentations. As described above, the ancillary data may include closed captioning text, DVR triggers, time codes, program IDs, and the like. The content provider may use a broadcast generator to create a baseband signal containing the media presentation and the ancillary data that is transmitted to a broadcast network provider which, in turn, transmits the information in the baseband signal to the end user. The content provider can test the broadcast signal to ensure that the media presentation and ancillary data are correct, but this does not guarantee that the media presentation and the ancillary data will not be inadvertently altered by the hardware and software components in the broadcast network.

To ensure the baseband signal is compatible with the components in the broadcast network, the embodiments herein test the baseband signal use an emulated version of the broadcast network. For example, the content provider can set up a local version of the broadcast network using the hardware components of the broadcast network (e.g., a cable head end, network modulators, set top boxes, receivers, etc.). By providing the baseband signal to the emulated network, the content provider can verify that the ancillary data will be correctly transmitted through the actual broadcast network, thereby providing a proof of concept.

In one embodiment, the emulated broadcast network includes a set top box which is switched into a diagnostic mode which results in the ancillary data in the broadcast signal being displayed along with the visual data of the media presentation. A technician can then view the ancillary data to determine if it matches what is expected. In one embodiment, the ancillary data includes a program ID (e.g., a Tribune Media Services (TMS) ID) that uniquely identifies the media presentation (e.g., a particular episode or segment of a television program, a movie, a promotional or commercial advertisement, and the like). The technician may view the ancillary data displayed on the screen and ensure the displayed program ID matches the program file that was converted and transmitted onto the emulated broadcast network using the baseband signal.

In another embodiment, a verification system automatically determines whether the ancillary data was properly transmitted through the emulated broadcast network. In this example, the verification system identifies the ancillary data displayed in a display frame of the media presentation and removes the video data in the display frame. Using a text recognition technique, the verification system determines the particular values or text of the ancillary data in the frame. These values are then compared to expected values to determine if the ancillary data matches the program file used to generate the baseband signal transmitted to the broadcast network. The verification system can transmit the results of this comparison to a technician.

FIG. 1 illustrates a system 100 for transmitting ancillary data in an emulated broadcast network 101, according to one embodiment described herein. The system 100 includes a computing device 105, a waveform monitor 145, the emulated broadcast network 101, a video IP encoder 190, network storage 125, and a computing device 195. In one example, the system 100 verifies that ancillary data transmitted in the emulated broadcast network 101 correctly reaches a customer end device of the broadcast network. In one embodiment, the system 100 is used as a proof of concept to determine whether ancillary data will correctly reach a customer when transmitted in the actual broadcast network. Stated differently, the emulated broadcast network 101 simulates transmitting a broadcast signal containing the audio, visual, and ancillary data on the actual broadcast network. As described below, the result of transmitting the broadcast signal on the emulated broadcast network 101 to determine if the broadcast signal (and more specifically, the ancillary data) will be correctly transmitted on the actual broadcast network.

The computing device 105 includes a broadcast generator 110 which generates the baseband signals transmitted to the emulated broadcast network 101 and a video card 115. The computing device 105 may include any number of processing elements (e.g., general purpose or specialized processors) and memory for performing the functions described herein. For example, the broadcast generator 110 may be a software application stored in the memory of computing device 105 which is executed using one or more processors.

As shown, the computing device 105 is coupled to the network storage 125 which can be a standalone server, a group of servers, or a cloud-computing environment. The network storage 125 includes a plurality of program files 130 which store audio/visual (AV) data and ancillary data for a media presentation. In one embodiment, the media presentation may be an episode of a television show or a movie. Further still, the network storage 125 may include a program file 130 for different segments of a show or movie which, when broadcasted to a customer of the broadcast network, are separated by commercial breaks. In another example, a program file 130 may be a promotional advertisement which is typically displayed during a commercial break to promote a different show or event than the one currently being broadcasted. As an example, the promotional advertisement may be aired during a commercial break for a sporting program that describes a television program that will be aired once the sporting event is over. In another example, the program file 130 may be a commercial advertisement for a product, event, political advertisement, and the like.

In one embodiment, the program files 130 are transmitted to the computing device 105 as material exchange format (MXF) files 120 which are containers which support a number of different streams of coded data. For example, the AV data in the MXF file 120 may be encoded using any of a variety of video or audio compression formats. Moreover, the MXF file 120 can include a metadata wrapper which describes the material contained within the file 120. This metadata wrapper can include ancillary data for the media presentation.

The broadcast generator 110 and video card 115 use the MXF file 120 to generate a baseband signal that is transmitted to the waveform monitor 145. In one embodiment, the baseband signal can be provided to a satellite dish or cable front end for transmission in a broadcast network. The baseband signal in FIG. 1 is a high-definition (HD) serial digital interface (SDI) signal 140 but the embodiments herein are not limited to such. To generate the HD SDI signal 140, the broadcast generator 110 uses the metadata in the MXF file 120 (i.e., the program file 130) to generate the HD SDI signal 140 which synchronizes the ancillary data to the corresponding AV data. For example, if the ancillary data includes text for closed captioning, the broadcast generator 110 inserts the text in the HD SDI signal 140 such that the text aligns with the corresponding visual data in the media presentation so that when viewed by the customer, the text matches the current visual data being displayed.

As described in more detail below, the ancillary data may include data for a digital video recorder (DVR) 160. In one embodiment, this type of ancillary data is not displayed to the customer but is instead used by the DVR 160 to perform some action such as display an icon to the user, identify the media presentation, interpret customer input, and the like.

The HD SDI signal 140 containing the AV and ancillary data is transmitted to the waveform monitor 145 which generates an output indicating what ancillary data is in the HD SDI signal 140. The output of the waveform monitor 145 enables a technician to determine what ancillary data is present in the baseband signal and whether that data is active or inactive.

FIG. 2 illustrates displaying ancillary data encoded in a network signal, according to one embodiment described herein. FIG. 2 illustrates an example output 200 generated by the waveform monitor 145 in FIG. 1. As shown, the output 200 displays the ancillary data in a packet of the baseband signal. In this example, the ancillary data includes an audio control packet, format ID, and V-ANC SMPTE data but not the EDH, LTC, VITC, and V-ANC ARIB data. By viewing the output 200, a technician can confirm that the baseband signal was properly formatted after being created by the broadcast generator 110. Stated differently, the output 200 of the waveform monitor enables the technician to ensure that the baseband signal inputted to the emulated broadcast network 101 is correct. Thus, if there is errors introduced into the ancillary data when the AV and ancillary data reaches the customer, the technician knows those errors were introduced in the emulated broadcast network 101 rather than the broadcast generator 110.

Returning to FIG. 1, the HD SDI signal 140 is received by a network modulator 150 in the emulated broadcast network 101. The network modulator 150 permits analog or digital data to be carried on specific determined frequencies (i.e., channels) such that an analog or digital television can receive the data. In one embodiment, the various components in the emulated broadcast network 101 (e.g., the network modulator 150 and set top box 155) are the same devices that are used in the actual broadcast network. Thus, by testing the performance of the emulated broadcast network 101, the technician can ensure the baseband signal will be transmitted correctly on the actual broadcast network. Moreover, although the video IP encoder 190 is shown as not being part of the emulated broadcast network 101, in other embodiments, the encoder 190 is part of the network 101. For example, the video IP encoder 190 may be physically located in the same box as the network modulator 150. That is, some network modulators typically include an IP encoder integrated within which can be used as the video IP encoder 190.

In one embodiment, the network modulator 150 is a QAM CATV modulator that converts the baseband broadcast signal into a network signal 165 particular to the broadcast network (e.g., a cable signal). In one embodiment, the network modulator 150 mixes the baseband signal with a carrier frequency to generate the broadcast network signal 165. However, if the baseband signal does not to be converted into a different modulated signal, then the modulator 150 may be omitted from the system 100.

The network modulator 150 transmits the network signal 165 to the set top box 155 and the television 175. The set top box 155 is an information appliance device that may contain a TV tuner input and a display output coupled to the television 175 (or multiple televisions). Set top boxes 155 are used in cable, satellite, and over-the-air broadcast networks. In this example, the set top box 155 includes a DVR 160 that can record media presentations encoded in the network signal 165. In one embodiment, the DVR 160 can record a media presentation the user is currently watching on the television 175 as well as shows the user is not watching. For example, because the network signal 165 may include all the media presentations on the broadcast network, the customer can control the set top box 155 to record a show that is airing at the same time as the show the customer is currently watching. Moreover, the DVR 160 can record a show when the customer is not watching the television 175. The DVR 160 can be manufactured and sold by the broadcast network or can be provided by a third-party (e.g., TiVo). Moreover, although the DVR 160 is shown as being integrated into the form factor of the set top box 155, in another embodiment, the DVR 160 is a standalone device separate from the set top box 155.

In one embodiment, the ancillary data includes information for the set top box 155 or the DVR 160. For example, the information may be encoded in the ancillary data using closed captioning formatting such as scenarist closed caption (SCC). However, the information for the DVR 160 may be put into comments or marked as being non-displayable using predefined tokens (e.g., a hashtag (#)). The DVR 160 can scan the closed captioning data to identify the DVR information while closed captioning software knows not to display the DVR information to the customer. In this manner, information intended for use by the DVR 160 can be embedded into the ancillary data.

The DVR 160 can use the information in the ancillary data to perform any number of functions such as recording a certain show, deleting recordings, requesting input from the customer, and the like. For example, if the ancillary data instructs the DVR 160 to provide an option to the user, the set top box 155 can transmit data to the television 175 using the device signal 170—e.g., a HDMI signal. In one example, the device signal 170 may include text or a graphic that is displayed over the visual data transmitted to the television 175 in the network signal 165.

The television 175 includes a display screen 180 and a receiver 185 which receives the network signal 165 and the device signal 170. The receiver 185 scans the network signal 165 to identify the AV data as well as the ancillary data. The receiver 185 may include hardware or software for detecting and outputting closed captioning if included in the ancillary data. However, as discussed above, the receiver 185 may ignore other types of ancillary data such as DVR information embedded in the comments of the closed captioning data. If closed captioning is active, the receiver 185 generates a display frame that includes the visual data and the ancillary data which is transmitted to the display screen 180 for output to the customer. If closed caption is deactivated, the receiver 185 generates a display frame using only the visual data—i.e., the closed captioning text is not displayed to the customer. Moreover, the receiver 185 may transmit the audio data in the network signal 165 to speakers (not shown) in the television 175 or to an external audio system.

Figure 3:
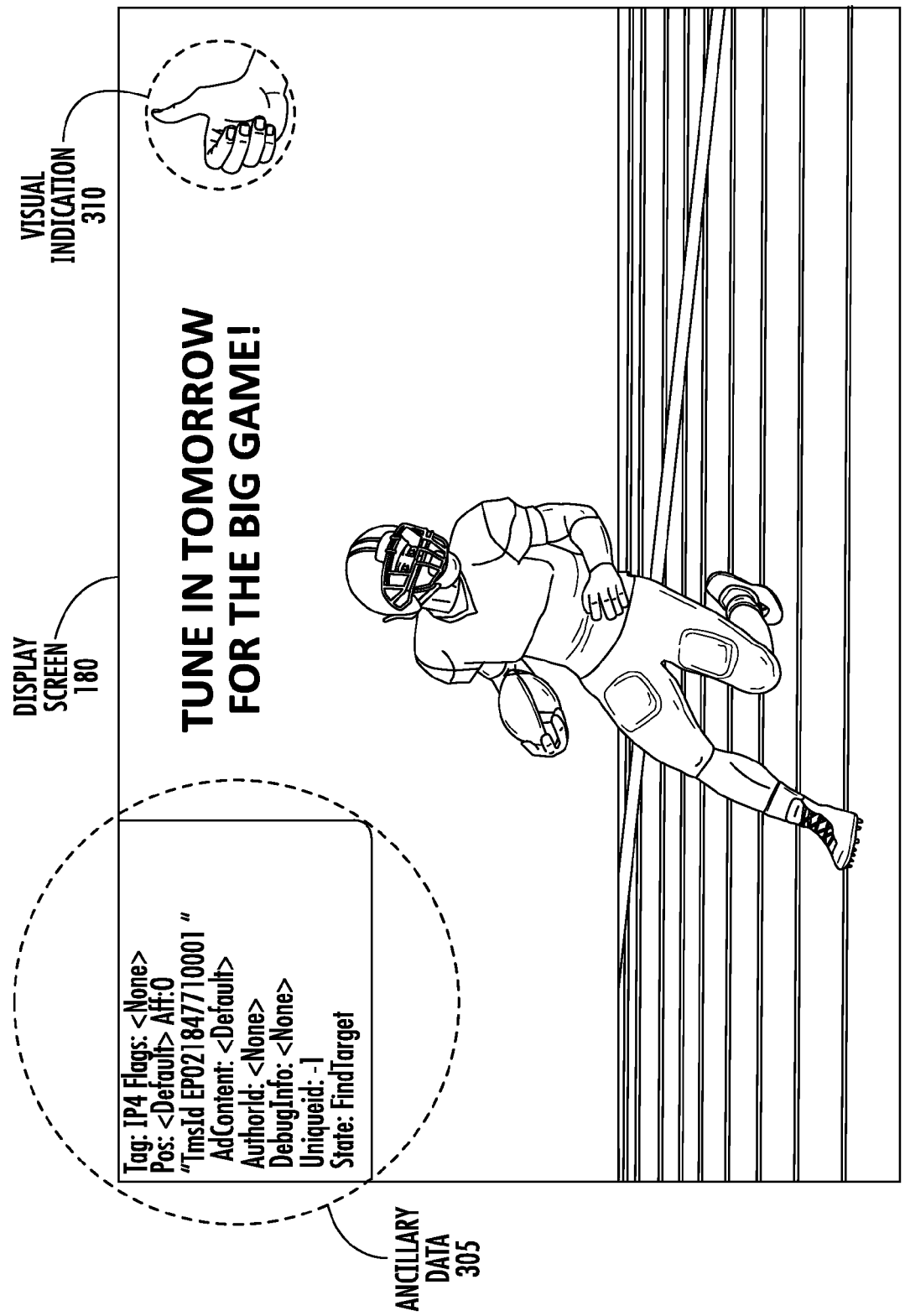
FIG. 3 illustrates displaying ancillary data in a display frame of a media presentation, according to one embodiment described herein.

In addition to displaying the visual and closed captioning data, the receiver 185 may generate display frames that include graphics or text provided by the DVR 160 using the device signal 170. One example of a display frame that includes a graphic provided by the DVR 160 is illustrated in FIG. 3. Specifically, FIG. 3 illustrates displaying ancillary data 305 in a display frame of a media presentation, according to one embodiment described herein. In this embodiment, the media presentation is promotional advertisement where the current display frame promotes a sporting event that will be broadcasted on the network the following day.

In FIG. 3, everywhere except for the ancillary data 305 and a visual indication 310 are part of the visual data found in the network signal 165 in FIG. 1. Stated differently, the text "TUNE IN TOMORROW FOR THE BIG GAME" and the graphic of the football player is defined by the visual data of the promotional advertisement. However, the visual indication 310 is not part of the network signal 165 but instead was provided to the television by the DVR 160 in the set top box 155. In one embodiment, the DVR 160 provides the visual indication 310 to the television in response to an instruction or information embedded in the ancillary data 305.

For example, the information in the ancillary data 305 may provide a program ID (e.g., a TMS ID) that uniquely identifies the media presentation being promoted by the promotional advertisement currently displayed on the display screen 180—i.e., the sporting event airing the next day. In response to identifying the TMS ID in the ancillary data 305, the DVR 160 instructs the receiver 185 in the television to add the visual indication 310 to the display frames sent to the display screen 180 for the promotional advertisement. In this example, the visual indication 310 corresponds to a button on a remote control that the customer can press which indicates to the DVR 160 that the customer wishes to record the promoted media presentation. Put differently, when the customer sees the visual indication 310 on the display screen 180, she knows by pressing a corresponding button, she can instruct the DVR 160 to record the promoted show.

If the user presses the button, the DVR 160 schedules an event to record the promoted show. In one embodiment, the DVR 160 uses the TMS ID in the ancillary data 305 to identify the promoted presentation and to determine when that presentation will air (if that information is not already provided in the ancillary data). For example, DVR 160 may query a schedule database using the TMS ID to determine when the media presentation will air. Once the broadcast date and time for the show identified by the TMS ID is known, the DVR 160 can schedule an event to record the promoted media presentation. In this manner, the DVR 160 uses the information in the ancillary data to enable the customer to easily record a show promoted during a commercial break simply by pressing a button on a remote or in response to a voice command (if the DVR 160 can be voice activated).

In order for the feature illustrated in FIG. 3 to function, the TMS ID in the ancillary data must be received correctly at the DVR 160. If, for example, the TMS ID becomes corrupted, then when the customer instructs the DVR 160 to record the media presentation (after seeing the visual indication 310 on the display screen 180), the DVR 160 will record the wrong media presentation or not record any media presentation. This can lead to frustration to the customer.

To verify the program ID in the ancillary data is correct, the DVR 160 can be switched into a diagnostic mode where the ancillary data 305 is displayed in the screen 180. That is, in addition to transmitting an instruction to the receiver 185 to display the visual indication 310, the DVR 160 transmits the ancillary data 305 in the device signal 170 to the receiver 185 for display. Normally, the DVR 160 would not instruct the receiver 185 to display the ancillary data 305. However, in this example, the ancillary data 305 is displayed in the upper left hand corner of the display screen 180. In one embodiment, the ancillary data 305 may be prioritized by the receiver 185 such that the data 305 is displayed over any visual data of the media presentation that may be at the same location of the display screen 180.

A technician can view the ancillary data 305 outputted by the television and confirm that the program ID (e.g., the TMS ID) received by the set top box 155 corresponds to the media presentation advertised by the promotional content. In this case, the TMS ID is "EP021847710001" which the technician can check to determine the value for the sporting event shown in the display screen 180. If so, the technician can verify to the operator of the broadcast network that the feature illustrated in FIG. 3—i.e., where the user can instruct the DVR 160 to record a promoted show upon seeing the visual indication 310—will work for the broadcast network. More specifically, transmitting the network signal through the emulated broadcast network 101 in FIG. 1 and verifying the TMS ID was properly displayed on the display screen 180 as shown in FIG. 3 serves as a proof of concept that the feature will work as intended with the current hardware devices (e.g., the network modulator 150 and set top box 155) and software applications in the broadcast network. Although the current embodiments describe emulating a broadcast network to verify DVR information or triggers embedded in ancillary data, the system 100 can be used to verify other types of ancillary data such as closed captioning and time codes are transmitted correctly in the broadcast network as well as the visual data in the media presentation. Various other uses of the system 100 to verify network signals are accurately transmitted in the emulated broadcast network is described later in this disclosure.

Returning to FIG. 1, the set top box 155 transmits the visual data as well as the ancillary data to a video IP encoder 190 (e.g., a QAM video IP encoder). In one embodiment, the video IP encoder 190 generates a video stream from the visual and ancillary data transmitted by the set top box 155 which is transmitted to the network storage 125. In turn, the network storage 125 stores the video stream as a diagnostic stream 135 which can be accessed by remote computing devices. In this example, the computing device 195 accesses the network storage 125 and downloads the diagnostic stream 135. Using a media player 197, a remote user can view the same information shown in FIG. 3 to verify that the feature works as intended on the emulated broadcast network 101. For example, the physical hardware of the emulated broadcast network 101 can be located in a first geographic location while the computing device 195 is located a second geographic location. Thus, the technician can access the diagnostic stream 135 using computing device 195 from any location and view the same information as being displayed on television 175. The technician can perform the same check using a display coupled to the computing device 195 as she would if she was viewing the display screen 180 of the television 175.

Figure 4:
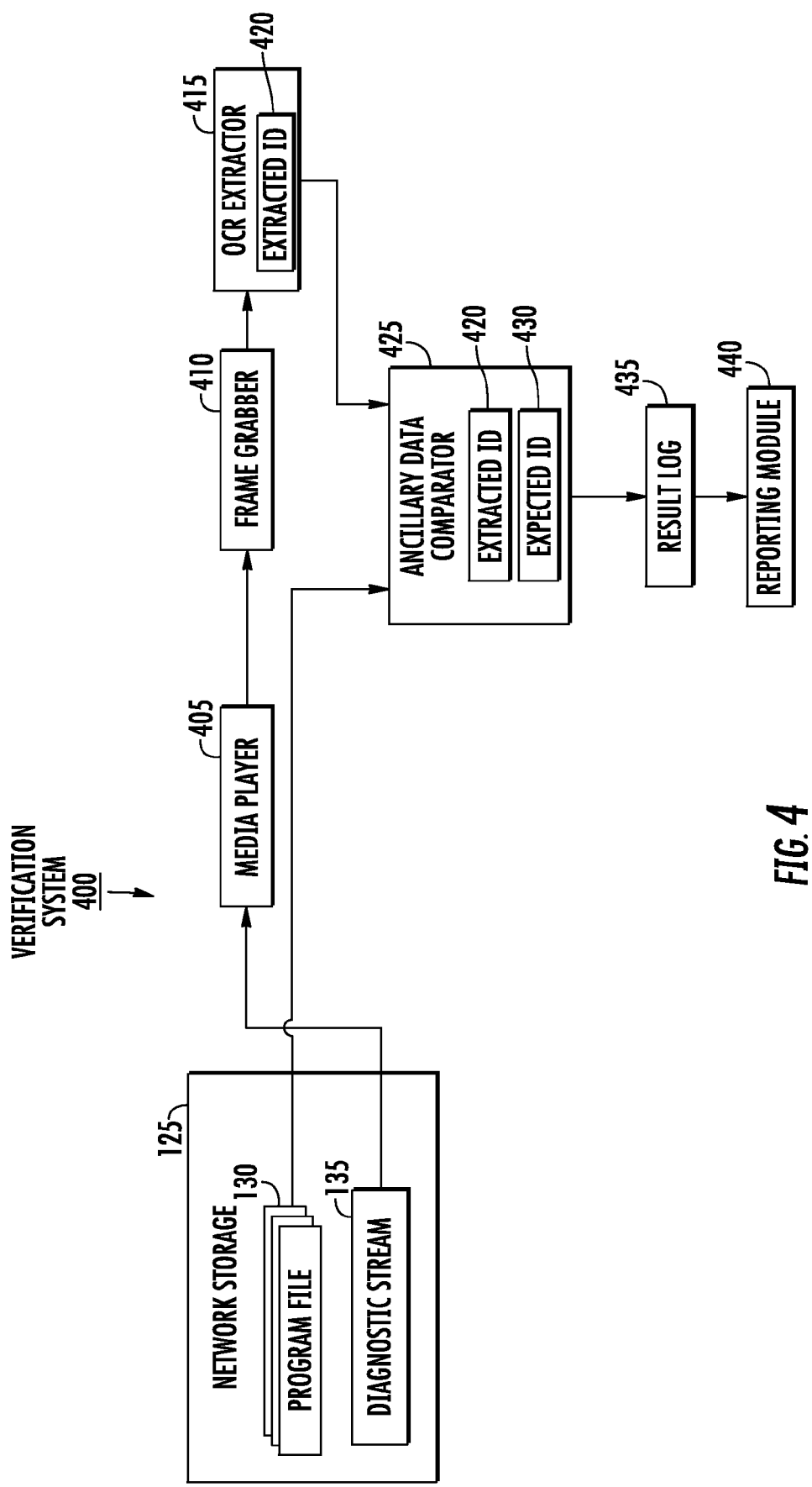
FIG. 4 illustrates a verification system for confirming ancillary data was correctly transmitted through an emulated broadcast network, according to one embodiment described herein.

FIG. 4 illustrates a verification system 400 for confirming ancillary data was correctly transmitted through an emulated broadcast network, according to one embodiment described herein. In general, the verification system 400 can automatically verify (i.e., without human intervention) that the ancillary data was correctly transmitted through the emulated broadcast network 101 in FIG. 1. That is, instead of a technician viewing the ancillary data 305 displayed in FIG. 3 to determine if the data values correspond to the expected values, the verification system 400 can perform this function and alert the technician if the ancillary data does, or does not, match the expected values.

The verification system 400 includes the network storage 125, a media player 405, a frame grabber 410, an optical character recognition (OCR) extractor 415, an ancillary data comparator 425, a result log 435, and a reporting module 440. In this example, the media player 405 retrieves the diagnostic stream 135 from the network storage 125. As described above, the diagnostic stream 135 can be a video stream generated by the video IP encoder 190. When processed by the media player 405, the diagnostic stream 135 may look similar to FIG. 3 where the ancillary data 305 overlaps the video data of a media presentation. In some embodiments, the diagnostic stream 135 may include the visual indication 310 added by the DVR 160 but this is not required. Although FIG. 4 illustrates receiving the diagnostic stream 135 from network storage 125, in another embodiment, the video IP encoder 190 can transmit the diagnostic stream 135 directly to the media player 405.

The media player 405 converts the diagnostic stream 135 into a series of display frames which can be transmitted to a video card and displayed on an output device—e.g., a television or monitor. However, in one embodiment, the display frames generated by the media player 405 are not displayed to the technician, but rather are transmitted to the frame grabber 410 which selects a portion of a frame. In one embodiment, the frame grabber 410 analyzes each display frame in the video stream and selects only a portion of the frame while discarding the rest. For example, the frame grabber 410 may remove the ancillary data 305 in FIG. 3 but discard the remaining video data in the frame. That is, because the ancillary data appears at the same location within the display frames in the video stream (e.g., the upper left corner), the frame grabber 410 separates this portion of the display frame from the remaining portion of the frame. In one embodiment, the frame grabber 410 stores the selected portion of the display frame as a standalone image or document (e.g., a JPEG or PDF).

The frame grabber 410 transmits the selected portion of the display frame or frames to the OCR extractor 415. Using a text recognition algorithm, the OCR extractor 415 searches and identifies text in the selected portion of the display frame. Stated differently, the OCR extractor 415 searches for identifiable characters in the selected portion. In one embodiment, once the OCR extractor 415 identifies "TmsId" in the ancillary data, the extractor 415 knows that the characters that follow this text are the TMS ID corresponding to the media presentation—e.g., "EP02184771001" as shown in FIG. 3. The OCR extractor 415 saves the TMS ID as an extracted ID 420. In this manner, the OCR extractor 415 can scan an image or file provided by the frame grabber 410 to identify a particular value of interest into ancillary data—e.g., a TMS ID in this example.

The OCR extractor 415 transmits the extracted ID 420 to the ancillary data comparator 425 which compares the extracted ID 420 to an expected ID 430. In one embodiment, the ancillary data comparator 425 receives the expected ID 430 from the network storage 125. For example, when a program file 130 is pulled from the network storage 125 and transmitted through the emulated broadcast network, the network storage 125 may transmit the TMS ID in the program file 130 to the ancillary data comparator 425 which stores the TMS ID as the expected ID 430. Thus, after receiving the extracted ID 420, the ancillary data comparator 425 can compare the extracted ID 420 with the expected ID 430 to determine if they match.

In another embodiment, the ancillary data comparator 425 may retrieve the expected ID 430 from a database or a spreadsheet. The comparator 425 may already know what media presentation was transmitted in the emulated broadcast network and use that information to index into the database or spreadsheet to determine the expected TMS ID 430. For example, the ancillary data comparator 425 may use a name, episode number, or advertisement name to index into the database and identify the expected ID that should be embedded in the ancillary data. In another example, the ancillary data comparator 425 may use the name of the MXF file of the program file to identify the expected ID 430.

The result log 435 tracks whether the extracted ID 420 matches the expected ID 430. In one embodiment, the technician may change the emulated broadcast network if, for example, there are different types of network modulators or set top boxes that may be used. Each time the emulated broadcast network is changed, the media presentation may be re-broadcasted into the emulated network to ensure the ancillary data is correctly transmitted through the network. The result log 435 can track these results and identify any configurations of the emulated broadcast network that do not support a desired feature that relies on information in the ancillary data.

The reporting module 440 may use wireless or wired means to transmit the results stored in the result log 435 to a technician. For example, if the comparator 425 determines the extracted ID 420 does not match the expected ID 430, the reporting module 440 can transmit an alert to the technician. Otherwise, the reporting module 440 informs the technician the ancillary data was correctly transmitted through the emulated broadcast network. In this manner, the verification system 400 can automatically verify the ancillary data was transmitted correctly without requiring any human intervention.

In one embodiment, the media player 405, frame grabber 410, OCR extractor 415, ancillary data comparator 425, result log 435, and reporting module 440 are located on the same computing system. For example, the functions performed by these components may be part of the same software application or a suite of applications. In other embodiments, however, these components may be distributed across multiple physical computing devices—e.g., in a data center or a cloud environment.

Figure 5:
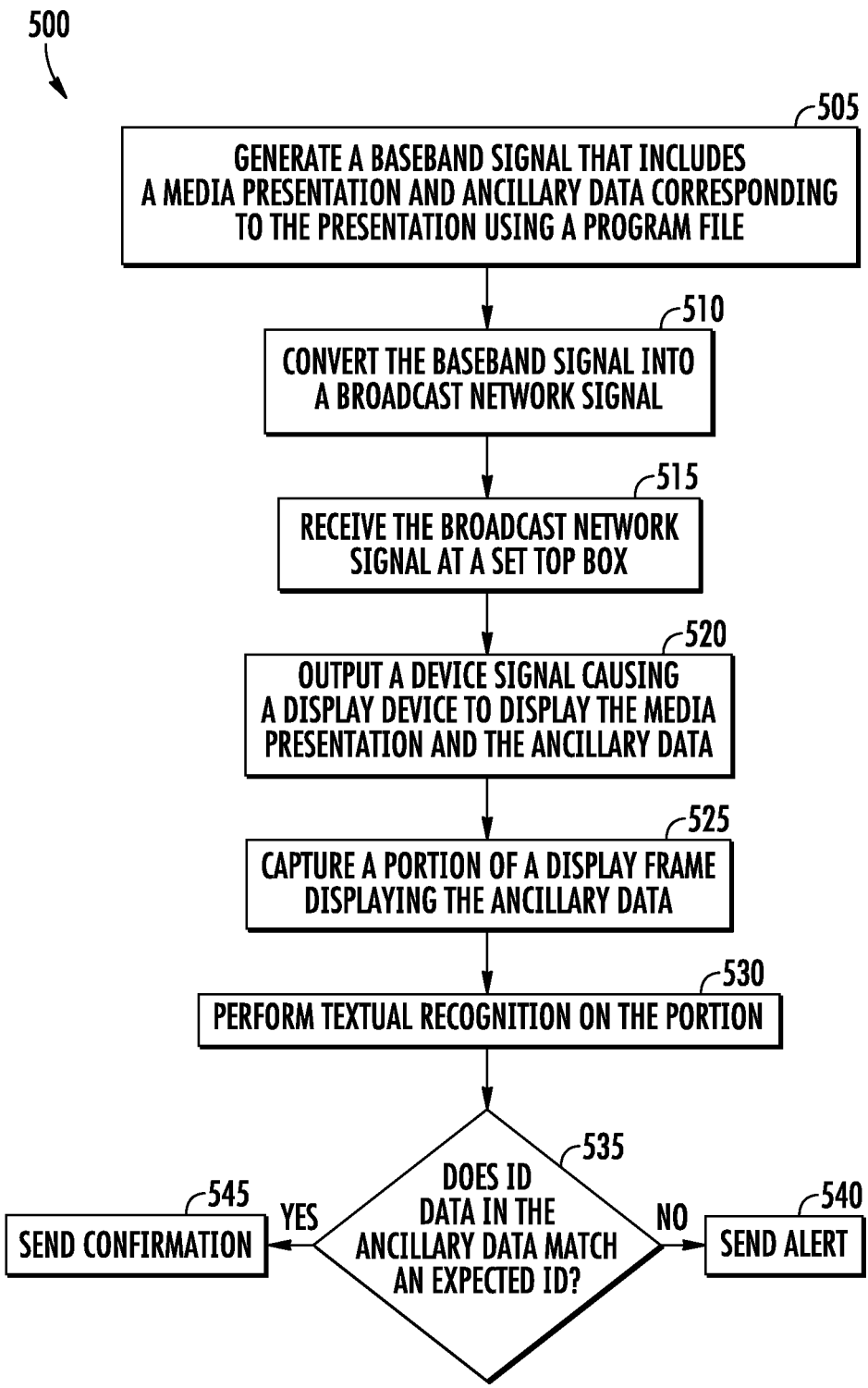
FIG. 5 is a flowchart for verifying that ancillary data is correctly transmitted through an emulated broadcast network, according to one embodiment described herein.

FIG. 5 is a flowchart for verifying that ancillary data is correctly transmitted through an emulated broadcast network, according to one embodiment described herein. At block 505, the broadcast generator generates a baseband signal (e.g., a HD SDI signal) that includes a media presentation and ancillary data corresponding to the presentation using a program file. For example, the media presentation may include AV data that is intended to be outputted to a viewer or customer of the broadcast network while the ancillary data may, or may not, be viewable. For example, the ancillary data can include closed captioning text that is viewable to the customer but can also include DVR triggers or time codes which are not typically outputted for display unless a set top box or DVR is in a diagnostic mode.

When generating the baseband signal, the broadcast generator may use the metadata in a MXF file (i.e., a program file) to synchronize the ancillary data to the corresponding AV data. For example, if the ancillary data includes text for closed captioning, the broadcast generator inserts the text in the baseband signal such that the text aligns with the corresponding visual data in the media presentation so that when viewed by the customer, the text matches the current video data being displayed.

At block 510, the network modulator converts the baseband signal into a broadcast network signal. In one embodiment, the network modulator mixes the baseband signal with a carrier frequency to generate the broadcast network signal. In another example, the network modulator may add additional data to the network signal such as internet signals.

At block 515, the set top box receives the broadcast network signal from the network modulator. At block 520, the set top box outputs a device signal causing a display device to display the media presentation and the ancillary data. In one embodiment, the set top box (or a DVR in the box) is in a diagnostic mode which results in ancillary data that is typically not displayed on the display device to be displayed. In the example illustrated in FIG. 3, the TMS ID in the ancillary data is displayed in the upper left corner of the display screen 180.

In addition, the device signal may include other content such as the visual indicator 310 in FIG. 3. This content may prompt the viewer for feedback, inform the viewer that a particular function is available (such as recording a promoted show), enable the user to purchase an advertised product, and the like. For instance, while FIG. 3 illustrates a feature where the viewer can select a button to instruct a DVR to record the promoted sporting event, in another example, the viewer can push a button which instructs the set top box to order a particular product being advertised in a commercial. In this manner, additional content can be displayed to the viewer by the set top box or DVR in addition to the AV and ancillary data included in the baseband signal.

At block 525, a frame grabber captures a portion of a display frame displaying the ancillary data while at block 530 an OCR extractor performs textual recognition on the portion of the display frame to identify readable text. From this text, the OCR extractor can identify the different types of ancillary data and the values of this data. In one embodiment, the OCR extractor determines the TMS ID in the ancillary data. As described above, the DVR may use the TMS ID to identify a particular media presentation that a viewer may want to record. Stated differently, the TMS ID may correspond to a media presentation that is currently being advertised by promotional content.

At block 535, the ancillary data comparator determines if the ID data in the ancillary data matches an expected ID. If so, this means the ancillary data was transmitted correctly through the emulated broadcast network and method 500 proceeds to block 545 where the reporting module informs a technician that the test was successful. If not, method 500 proceeds to block 540 where the reporting module transmits an alert to the technician indicating the test was not successful.

Although the embodiments describe using the emulated broadcast network in FIG. 1 and the verification system in FIG. 4 to verify if a program ID in the ancillary data was broadcasted correctly, method 500 may be used to verify the correctness of any of the ancillary data. For example, if the ancillary data contains closed captioning, the frame grabber can separate the portion of the display frame that includes the closed captioning while the OCR extractor can convert the portion into readable text. Using the time codes in the ancillary data or a schedule, the ancillary data comparator can ensure the closed captioning is displayed at a time in which the corresponding visual data is outputted. In another example, method 500 can be used to verify if DVR instructions are properly received at the DVR in the emulated broadcast network. By instructing the set top box to display the DVR instructions in the ancillary data, the verification system in FIG. 4 can confirm the DVR instructions match the original instructions embedded in the baseband signal.

Moreover, although FIG. 1 illustrates simulating a cable distribution network using the emulated broadcast network 101, the embodiments herein are not limited to such. In another embodiment, the emulated broadcast network 101 can be an internet IP content distribution network (CDN). The hardware in the emulated broadcast network 101 may be different than what is shown. For example, instead of a network (QAM) modulator 150, a feed can be taken from the internet service provider (ISP) into the set top box 155 which can be an interface between the ISP and a television. For example, the set top box 155 may be a media player that contains applications that convert streaming content receives from the ISP into audio/visual output for the television. In another embodiment, the television may include an integrated media player or streaming application in which case an external set top box 155 is not needed. To verify the ancillary data in the feed provided by the ISP was transmitted properly, the verification system 400 in FIG. 4 reads the output codes in ASCII and processes the data as discussed in method 500.

In another embodiment, the emulated broadcast network 101 simulates a file delivery system. Here, the emulated broadcast network 101 can deliver file based content which is formatted to industry specific standards (such as Cablelabs compliant content) to the DVR 160 for playback and display.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
converting a baseband signal to a network signal used in an emulated broadcast network, the baseband signal comprising audio/visual (AV) data and ancillary data corresponding to a media presentation;
generating a video stream from the network signal after the network signal has propagated through the emulated broadcast network, wherein the video stream includes a plurality of display frames of the media presentation, and wherein each of the plurality of display frames displays a program ID in the ancillary data when outputted on a display device;
performing textual recognition to identify the program ID in a first one of the plurality of display frames; and
verifying the ancillary data was transmitted correctly through the emulated broadcast network by comparing the identified program ID to an expected program ID corresponding to the media presentation.

2. The method of claim 1, further comprising:
transmitting the baseband signal to a waveform monitor before providing the baseband signal to the emulated broadcast network; and
displaying the ancillary data in the baseband signal using the waveform monitor.

3. The method of claim 2, wherein the baseband signal comprises a serial digital interface (SDI) signal.

4. The method of claim 1, wherein the emulated broadcast network comprises a set top box, wherein the method further comprises:
displaying the program ID in the plurality of display frames when the set top box is in a diagnostic mode, wherein when the set top box is not in the diagnostic mode, the program ID is not displayed in the plurality of display frames.

5. The method of claim 1, further comprising:
capturing a portion of the first one of the plurality of display frames before performing textual recognition, wherein the portion includes the ancillary data and not any visual data of the media presentation, wherein textual recognition is performed only on the portion of the first one of the plurality of display frames.

6. The method of claim 1, wherein the emulated broadcast network includes a network modulator that converts the baseband signal to the network signal and a set top box coupled to the display device.

7. The method of claim 6, wherein the set top box comprises a digital video recorder (DVR), the method further comprising:
   instructing a television to output a visual indication corresponding to a feature performed by the DVR, wherein the feature uses the program ID to identify at least one of an event or show to be recorded by the DVR at a future time.

8. The method of claim 1, wherein the media presentation comprises promotional content, wherein the program ID uniquely identifies at least one of an event and a show being advertised by the promotional content.

9. A system, comprising:
   an emulated broadcast network comprising at least one hardware component, wherein the emulated broadcast network is configured to convert a baseband signal to a network signal used in the emulated broadcast network the baseband signal comprising audio/visual (AV) data and ancillary data corresponding to a media presentation; and
   video encoder configured to generate a video stream from the network signal after the network signal has propagated through the emulated broadcast network, wherein the video stream includes a plurality of display frames of the media presentation, and wherein each of the plurality of display frames displays a program ID in the ancillary data when outputted on a display device;
   an optical character recognition (OCR) extractor configured to perform textual recognition to identify the program ID in a first one of the plurality of display frames; and
   an ancillary data comparator configure to verify the ancillary data was transmitted correctly through the emulated broadcast network by comparing the identified program ID to an expected program ID corresponding to the media presentation.

10. The system of claim 9, further comprising:
    a broadcast generator configured to generate the baseband signal; and
    a waveform monitor coupled between the broadcast generator and the emulated broadcast network, the waveform monitor configured to:
      displaying the ancillary data in the baseband signal.

11. The system of claim 10, wherein the baseband signal comprises a serial digital interface (SDI) signal.

12. The system of claim 9, wherein the emulated broadcast network comprises a set top box, the emulated broadcast network is configured to:
    display the program ID in the plurality of display frames when the set top box is in a diagnostic mode, wherein when the set top box is not in the diagnostic mode, the program ID is not displayed in the plurality of display frames.

13. The system of claim 9, further comprising:
    a frame grabber configured to capture a portion of the first one of the plurality of display frames before performing textual recognition, wherein the portion includes the ancillary data and not any visual data of the media presentation, wherein textual recognition is performed only on the portion of the first one of the plurality of display frames.

14. The system of claim 9, wherein the emulated broadcast network includes a network modulator that converts the baseband signal to the network signal and a set top box coupled to the display device.

15. The system of claim 14, wherein the set top box comprises a digital video recorder (DVR), the set top box is configured to instruct a television to output a visual indication corresponding to a feature performed by the DVR, wherein the feature uses the program ID to identify at least one of an event or show to be recorded by the DVR at a future time.

16. The system of claim 15, wherein the media presentation comprises promotional content, wherein the program ID uniquely identifies at least one of the event and the show being advertised by the promotional content.

17. A system, comprising:
    one or more computing processors; and
    a memory comprising a program that when executed by the one or more computer processors performs an operation for verifying ancillary data was transmitted correctly through an emulated broadcast network, the operation comprising:
      receiving a video stream derived from a network signal that has propagated through the emulated broadcast network, wherein the video stream includes a plurality of display frames of a media presentation encoded in the network signal, and wherein each of the plurality of display frames also displays ancillary data encoded the network signal when outputted on a display device;
      performing textual recognition to identify text in the ancillary data displayed in a first one of the plurality of display frames; and
      verifying the ancillary data was transmitted correctly through the emulated broadcast network by comparing the identified text of the ancillary data to expected text corresponding to the media presentation.

18. The system of claim 17, wherein the emulated broadcast network comprises a set top box, wherein the plurality of display frames display the ancillary data only when the set top box is switched to a diagnostic mode.

19. The system of claim 17, wherein the operation further comprises:
    capturing a portion of the first one of the plurality of display frames before performing textual recognition, wherein the portion includes the ancillary data and not any visual data of the media presentation, wherein textual recognition is performed only on the portion of the first one of the plurality of display frames.

20. The system of claim 17, wherein the media presentation comprises promotional content, wherein the text of the ancillary data includes a program ID uniquely identifying at least one of an event and a show being advertised by the promotional content.

* * * * *